No. 829,639. PATENTED AUG. 28, 1906.
H. ENGEL.
EYEGLASSES.
APPLICATION FILED DEC. 5, 1905.

WITNESSES:
M. E. Lucker.
J. M. Wynkoop

INVENTOR
Henry Engel

BY Emil Bönnelycke
ATTORNEY

UNITED STATES PATENT OFFICE.

HENRY ENGEL, OF NEW YORK, N. Y.

EYEGLASSES.

No. 829,639.　　Specification of Letters Patent.　　Patented Aug. 28, 1906.

Application filed December 5, 1905. Serial No. 290,439.

*To all whom it may concern:*

Be it known that I, HENRY ENGEL, a citizen of the United States, and a resident of New York city, in the State of New York, have invented certain new and useful Improvements in Eyeglasses; and I hereby declare the following to be a complete description of same, with reference to the accompanying drawings.

Generally, my invention relates to such eyeglasses in which the braces or guards holding the eyeglasses securely upon the nose consist of two separate and adjustable parts which in their inoperative position both lie in the same plane with the glasses.

Specifically, my invention embodies auxiliary braces in addition to the substantially stationary spring guards or braces, said auxiliary braces being adjustable and securely held in two different positions, so as to not project beyond the plane of the glasses or to be adapted to tightly hold the glasses upon the nose, disregarding the various forms thereof. To this end I make both braces, the stationary as well as the auxiliary braces, yielding or springy, so as to closely fit the nose, while the adjustable brace is pivoted at its lower end, so as to spring inwardly for use at such angle as to securely rest upon its seat, both the operative and inoperative positions being insured by spring means yielding under a slight finger-pressure.

Figure 1:
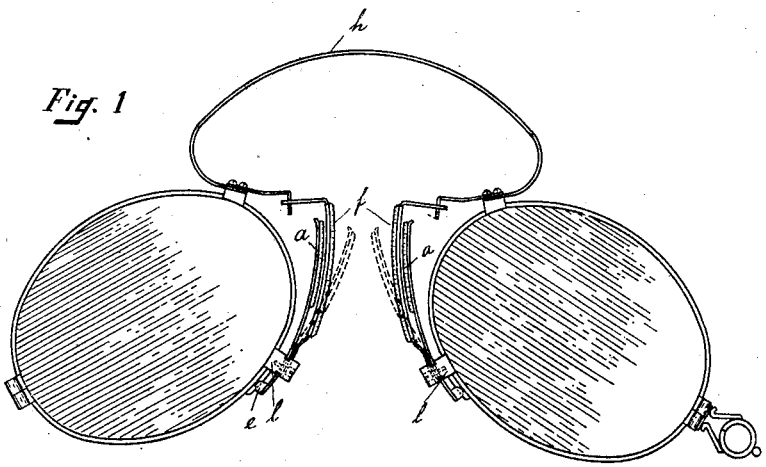
Figure 2:
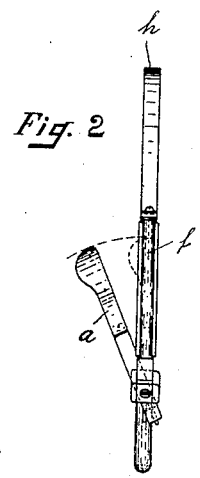
Figure 3:
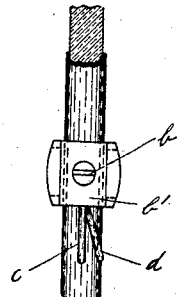
Figure 4:
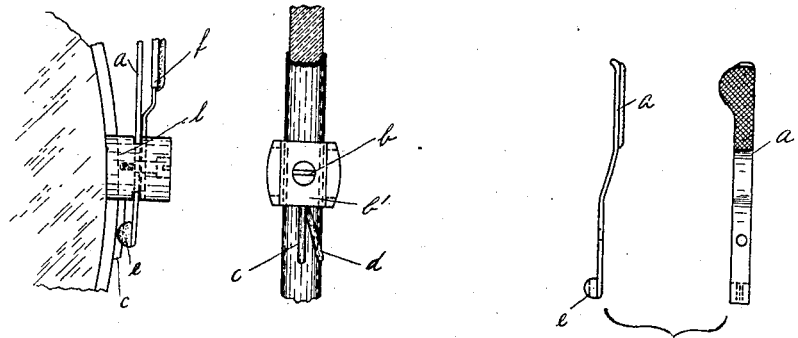
Figure 5:
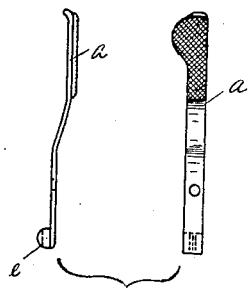

In the drawings, Figure 1 shows the assembled glasses, the operative position of the auxiliary braces being shown in dotted lines. Fig. 2 is a vertical middle section through the glasses looking against the edge of the glasses, the auxiliary brace being shown in its operative position. Fig. 3 is a front view of part of the left-hand mounting on a larger scale. Fig. 4 is a side view of this left-hand mounting, the stationary and auxiliary braces being omitted. Fig. 5 shows in detail the auxiliary brace from the front, and Fig. 6 shows the auxiliary brace from the side.

The lenses are held together by the usual spring $h$. The stationary braces $f$ are secured to the lenses or their rims by the usual brace-supports or studs $l$, the same screw $b$ serving for holding the stationary brace $f$ and as a pivotal point for the auxiliary brace $a$, the studs $l$ being recessed in longitudinal direction of the braces, so as to give the latter a good bearing, a rectangular washer $b'$ being inserted between the head of the screw $b$ and the stationary brace $f$, which rests above the auxiliary brace $a$. The width of the two braces $a$ and $f$ at their bearing-points are slightly different, the auxiliary braces $a$ being somewhat narrower, so as to allow the slight angular motion for adjustment into their operative position. From the studs $l$ downwardly and close to the rim or edge of the lenses project two short and divergent wires $c$ and $d$, the relative position of which may be easily changed by bending the one or the other, or both. The lower ends of the auxiliary braces $a$ project beyond their bearing-points and are provided with little knobs $e$, having recesses to engage with the wires $c$ or $d$, respectively. In this way the inoperative and operative position of the auxiliary braces and operative position of the auxiliary braces may be secured as well as relatively to each other adjusted in accordance with the nose upon which they are to be supported. Cork or horn may be used on both braces $a$ and $f$ in the usual way. By making both braces springy and adjustable as to their relative position and by pivoting the auxiliary braces at their lower ends a firm support for the eyeglasses is insured upon any nose, necessitating no, or little, adjustment, which may be accomplished within a few seconds, if necessary.

It is well known that the most secure hold of the eyeglass-braces is near the cavity of the eye, and the ordinary straight braces rarely reach there at all, and if they do they give a support at practically only a single point, which they wear out, and make sore and inflame in many cases. Considering that at the present time a great majority of people whose noses are not very adaptable for wearing eyeglasses are compelled to use them, often for short periods only, thus making spectacles very undesirable, it is of great importance to have a construction of eyeglasses which, with as little time and as little inconvenience as possible, may be made to fit and securely hold upon any kind of a nose without any wear upon their supporting-surfaces, and this I accomplish with my above-described invention. The innermost and most advantageous points of support can be reached with the upper ends of the auxiliary braces, while their springy condition insures their resting upon the sides of the nose with their entire length, the stationary braces assisting them and insuring a firm support of the eyeglasses against any vibration.

Having thus described my said invention, what I claim, and desire to secure by Letters Patent, is—

1. In a pair of eyeglasses, the combination of brace-supports, substantially stationary braces and springy auxiliary braces pivoted at their lower ends to said supports approximately in the plane of the glasses when not in use, and means to secure the pivoted braces in their inoperative position.

2. In a pair of eyeglasses, the combination of brace-supports, substantially stationary braces and springy auxiliary braces pivoted at their lower ends to said supports, and means to secure the pivoted braces in their inoperative and operative positions respectively.

3. In a pair of eyeglasses, the combination of brace-supports, substantially stationary braces and springy auxiliary braces pivoted at their lower ends to said supports, and adjustable means to secure the pivoted braces in their inoperative and operative positions respectively.

4. In a pair of eyeglasses, the combination of brace-supports, substantially stationary braces and auxiliary braces pivoted at their lower ends to said supports, and two divergent wires adjustably secured to the eyeglasses, the auxiliary braces projecting at their lower ends beyond their pivotal point, said projections being adapted to engage with one or the other of said diverging wires so as to secure the inoperative and operative positions respectively of said auxiliary braces.

5. In a pair of eyeglasses, the combination of substantially stationary braces and auxiliary braces, studs secured to the eyeglasses and having a recess and a screw therein to support and fasten the stationary braces and to serve as a pivotal point for the lower ends of the auxiliary braces, diverging wires secured to and downwardly projecting from said studs and a projection on the auxiliary braces below their pivotal point and engaging one or the other of said diverging wires so as to secure the inoperative or operative positions respectively of said auxiliary braces.

In testimony that I claim the foregoing as my invention I have signed my name, in the presence of two subscribing witnesses, this 4th day of December, 1905.

HENRY ENGEL.

Witnesses:
C. WILTON GRUEBER,
OTTO PAUL.